US012715167B2

(12) United States Patent
Ünal et al.

(10) Patent No.: US 12,715,167 B2
(45) **Date of Patent: *Aug. 25, 2026**

(54) RECYCLABLE PET FILM

(71) Applicant: Mitsubishi Polyester Film GmbH, Wiesbaden (DE)

(72) Inventors: Alper Ünal, Ober-Hilbersheim (DE); Thiemo Herbst, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 725 days.

This patent is subject to a terminal disclaimer.

(21) Appl. No.: 17/990,865

(22) Filed: Nov. 21, 2022

(65) Prior Publication Data

US 2023/0158725 A1 May 25, 2023

(30) Foreign Application Priority Data

Nov. 22, 2021 (DE) ..................... 10 2021 130 531.4

(51) Int. Cl.

*B29C 48/08* (2019.01)
*B29C 48/00* (2019.01)
*C08J 7/04* (2020.01)
*C08J 7/043* (2020.01)
*C08J 11/16* (2006.01)
*B29K 67/00* (2006.01)

(52) U.S. Cl.

CPC ............ *B29C 48/022* (2019.02); *B29C 48/08* (2019.02); *C08J 7/042* (2013.01); *C08J 7/043* (2020.01); *C08J 11/16* (2013.01); *B29K 2067/00* (2013.01); *C08J 2367/02* (2013.01)

(58) Field of Classification Search

USPC .................... 521/48; 528/190, 194, 196, 198
See application file for complete search history.

(56) References Cited

U.S. PATENT DOCUMENTS

| | | | | |
|---|---|---|---|---|
| 5,073,435 | A | 12/1991 | Eyraud et al. | |
| 2004/0024102 | A1 * | 2/2004 | Hayes | B32B 7/12 524/425 |
| 2006/0009609 | A1 | 1/2006 | Hayes | |

FOREIGN PATENT DOCUMENTS

| | | | |
|---|---|---|---|
| DE | 10 2006 016634 | A1 | 10/2007 |
| EP | 1 612 237 | A1 | 1/2006 |
| JP | 2002265665 | A | 9/2002 |

OTHER PUBLICATIONS

European Search Report in corresponding European Patent Application No. 22208532.6.

* cited by examiner

*Primary Examiner* — Terressa Boykin
(74) *Attorney, Agent, or Firm* — ProPat, LLC; Cathy R. Moore

(57) ABSTRACT

The present invention relates to a multilayer, coextruded polyester film that includes at least one outer layer (A) and a base layer (B), in which the at least one outer layer (A) includes to an extent of at least 60 wt % of a copolyester that includes units derived from dicarboxylic acids and diols, in which the units derived from dicarboxylic acids include at least 65 mol % of units derived from terephthalic acid and at least 5 mol % of units derived from 5-sulfoisophthalic acid and the units derived from diols include at least 90 mol % of units derived from ethylene glycol.

The present invention further relates to a process for producing the film according to the invention, to the use thereof and to a process for recycling the polyester film according to the invention.

20 Claims, No Drawings

RECYCLABLE PET FILM

CROSS-REFERENCE TO RELATED APPLICATIONS

This application claims priority to German Patent Application No. 10 2021 130 531.4 filed Nov. 22, 2021, which is hereby incorporated herein by reference in its entirety.

FIELD OF THE INVENTION

The present invention relates to a multilayer, coextruded polyester film comprising at least one outer layer (A) and a base layer (B), to a process for the production thereof, to the use thereof and to a process for recycling a polyester film.

BACKGROUND OF THE INVENTION

Industrial applications often use biaxially oriented polyester film as a process auxiliary, for example as a carrier film, which requires disposal after use/application. Examples include siliconized films for the application of labels or films that are used in the field of emboss printing and are provided with various lacquer and metal layers. This process film remains after use and requires disposal. In the case of an embossing film provided with lacquer and metal layers an embossing film coated over its entire area is used to transfer an image onto a substrate, wherein as a consequence of the process a negative of this image remains on the embossing film and can no longer be used. The remnants of this process are thus naturally not clean polyester but severely contaminated and not directly recyclable.

In the case of a process film for the application of labels the remaining siliconized film is generally contaminated. Remaining labels, adhesive residue and general contamination that accumulate during collection contaminate the polyester raw material and prevent direct recycling.

In the present context direct recycling is to be understood as meaning an industrial process in which the wastes can be reprocessed into new raw material in fully automated fashion without any need for manual sorting or cleaning of the wastes which would markedly increase costs for the recycling.

If direct recycling is impossible the wastes may be recycled with the aid of further processes. In the case of downcycling the wastes are often supplied to the production of lower value applications together with wastes from other processes. Due to the many possible waste sources it is often necessary to include a sorting step to achieve at least a rough varietal purity in terms of the polymer. This may include for example a separation of light and heavy fractions in an air stream or a so-called float-sink process where lighter plastics (having a density <1 g/ccm) float and can be separated from the polyester fraction (having a density >1 g/ccm) in a water bath. This makes it possible to separate polyester from polyolefins.

However, if the wastes are to be made available not to lower value applications but rather to equal value or even higher value applications there is a need not only for varietal purity but also for an additional cleaning step to remove adherent soiling/contamination by foreign material. This cleaning step comprises for example washing processes using aqueous washing liquors, thus removing adherent impurities and allowing the resulting recyclate to be sent for reuse (for example extrusion).

Polyester film is intrinsically exceptionally suitable for direct recycling since PET, given suitable processing, can be re-used over and over practically without limitation. Thus, EP 1 612 237 describes a process in which varietally pure film remnants (film scrap, edge trimmings) are initially comminuted, aftertreated by vacuum condensation and subsequently extruded to afford pellets so that the resulting raw material may be returned to film production.

The challenge in the case of wastes of process films which as carrier films have already gone through a plurality of superordinate processing operations is that of easily separating adherent soiling.

A biaxially oriented polyester film that may be freed of adherent residues (such as result for example from hot stamping processes) by simple industry standard washing processes after use, so that its cleaned remnants may be sent for direct recycling into new polyester film has not yet been disclosed. Current process films may after use be processed only into lower value recyclate which cannot be sent to a film production process but only to applications having low requirements, such as textile fibres for example. Obtaining low-value regenerate is not desired.

Typically, process films may optionally be provided with a functional coating. Depending on the application this comprises for example adhesion promoters or, on the contrary, release layers. To be able to securely apply coatings to the film it is necessary to ensure that the surface of the polyester film is insensitive to moisture effects. The anchoring of the coating on the film surface must also be ensured. The use of standard polyester raw materials, which generally derive from ethylene glycol and terephthalic acid units, ensures sufficient coatability. However, the insensitivity of the film to moisture runs counter to the actual purpose of the invention, that is to facilitate the detachment of soiling on the surface by simple washing processes and thus to allow direct recyclability. Polyester films which have a surface suitable for application of a coating while simultaneously exhibiting elevated solubility are not described in the prior art. By contrast, related solutions may be found in similar technical fields.

JP2002265665A describes a release film having a release layer constructed from readily soluble raw materials which after wetting of the film may be detached using solvents. This makes it possible to recover the remaining base film. Proposed materials for the readily soluble raw materials are not only polyesters that are not further specified but also polyester urethanes, acrylic raw materials and EVOH and PVOH, wherein polyvinyl alcohols are favoured. In addition, hydroxy, carboxyl, sulfonate and carboxylate groups are recited as functional groups that may be present in the water-soluble raw material. To recover the base layer the film is washed with water at room temperature in the case of the PVOH layer, with water at 70° C. in the case of the layer of water-soluble polyester or with NMP at 60° C. in the case of the layer of polylactic acid and subsequently dried. While the films do show the desired effect, that the surface is easily detachable, surfaces soluble in pure water show a high sensitivity towards moisture which in particular hampers extended storage of the film.

Films that are insensitive to moisture effects and simultaneously exhibit good washability via an industrial washing process cannot be found in the prior art.

SUMMARY OF ADVANTAGEOUS EMBODIMENTS OF THE INVENTION

The problem addressed by the present invention is that of providing a biaxially oriented polyester film (BoPET, hereinbelow polyester film), the properties of which in terms of mechanical, thermal and chemical stability are largely identical to a conventional biaxially oriented polyester film and which after use can be reprocessed such that it can consequently be sent to a direct recycling to afford as-new quality biaxially oriented polyester film, thus avoiding downcycling.

The problem is solved by the multilayer, coextruded polyester film according to the invention comprising at least one outer layer (A) and a base layer (B), wherein the at least one outer layer (A) consists to an extent of at least 60 wt % of a copolyester consisting of units derived from dicarboxylic acids and diols, wherein the units derived from dicarboxylic acids comprise at least 65 mol % of units derived from terephthalic acid and at least 5 mol % of units derived from 5-sulfo-isophthalic acid and the units derived from diols comprise at least 90 mol % of units derived from ethylene glycol.

DETAILED DESCRIPTION OF ADVANTAGEOUS EMBODIMENTS OF THE INVENTION

Polyester Film

The present invention relates to a multilayer, coextruded polyester film comprising at least one outer layer (A) and a base layer (B), wherein the at least one outer layer (A) consists to an extent of at least 60 wt % of a copolyester consisting of units derived from dicarboxylic acids and diols, wherein the units derived from dicarboxylic acids comprise at least 65 mol % of units derived from terephthalic acid and at least 5 mol % of units derived from 5-sulfo-isophthalic acid and the units derived from diols comprise at least 90 mol % of units derived from ethylene glycol.

According to the invention the at least one outer layer (A) consists to an extent of at least 60 wt %, preferably to an extent of at least 70 wt %, particularly preferably to an extent of at least 80 wt %, of a copolyester consisting of units derived from dicarboxylic acids and diols. The remaining at most 40 wt %, preferably at most 30 wt %, particularly preferably at most 20 wt %, consist of polyethylene terephthalate.

In addition to the recited copolyesters the outer layer (A) may comprise additives in order to optimize for example the winding behaviour of the film.

Providing a polyester film which after appropriate washing treatment is amenable to a direct recycling process requires an at least 2-layered film whose primary constituents are polyesters. The layers form the base layer (B) of the film and functions as the supporting element in the film construction. The base layer (B) may itself comprise a plurality of layers, for example of different polyesters, should this be necessary. In addition to the base layer (B) the film consists of at least one further layer which is coextruded together with the base layer and forms a soluble outer layer (A) of the film.

The polyester film according to the invention may additionally comprise a second outer layer (A). In this case the at least one outer layer (A) is a first outer layer (A) and the polyester film additionally comprises a second outer layer (A) which has been applied to the surface of the polyester film opposite the first outer layer (A). The first outer layer (A) and the second outer layer (A) are of identical construction, i.e. they consist of an identical copolyester. However, thickness of the first outer layer (A) and the second outer layer (A) may be different.

The present invention accordingly may relate to a polyester film where the at least one outer layer (A) is a first outer layer (A) and the polyester film additionally comprises a second outer layer (A) which has been applied to the surface of the polyester film opposite the first outer layer (A).

The polyester film according to the invention may alternatively comprise an outer layer (C) which has been applied to the surface of the polyester film opposite the first outer layer (A). In this case the polyester film comprises an outer layer (A) which has been applied on one side of the polyester film and an outer layer (C) which has been applied to the side of the polyester film opposite the first outer layer (A).

The base layer (B) and the outer layer (C) preferably contain at least 70 wt %, particularly preferably at least 90 wt %, of thermoplastic polyester. Suitable therefor is a polyester consisting of ethylene glycol and terephthalic acid units (polyethylene terephthalate, PET). The polyester in the base layer (B) may contain up to 40 wt %, preferably up to 20 wt %, of regenerate obtained from the process for recycling according to the invention.

According to the present invention the at least one outer layer (A) has the feature that upon contact with an aqueous alkali metal hydroxide-containing solution it dissolves faster than the remaining layers of the polyester film (base layer (B) and optionally the outer layer (C).

The total thickness of the polyester film is 4 to 250 μm, preferably 6 μm to 125 μm, particularly preferably 9 μm to 75 μm. Thicker or thinner films are conceivable in principle but the handling (for example winding, transporting, comminuting) of very thin or very thick films is generally associated with difficulties, as a result of which the present invention concentrates on the recited thickness range. The main proportion of the total thickness is accounted for by the base layer (B) which typically accounts for about 70-95% of the total film thickness. The at least one outer layer (A) accounts for 5% to 20%, preferably 5% to 10%, of the total film thickness. When the polyester film comprises a first outer layer (A) and a second outer layer (A) the thickness of the first outer layer (A) and the second outer layer (A) each independently accounts for a proportion of 1% to 20% of the total film thickness. However, irrespective of the total film thickness the absolute thickness of each outer layer (A) should not undershoot 0.5 μm irrespective of whether one or two outer layers (A) are present. At less than 0.5 μm complete washability of impurities can no longer be reliably maintained. The at least one outer layer (A) or, if present, the first and the second outer layer (A) each have a thickness of 0.5 μm to 6 μm, preferably from 1 μm to 3 μm. Higher thicknesses of the outer layer (A) are associated with greater losses of recyclable material which is not the spirit of the invention.

It has surprisingly been found that the base layer (B), the outer layer (A) and, if present, the outer layer (C) can be selected in terms of their polymer composition such that in the washing process a selective dissolvability of the outer layer (A) is achieved while the base layer (B) and, if present, the outer layer (C) remain virtually untouched. This is achieved by a certain copolyester which is used in the outer layer (A) and exhibits a solubility for aqueous alkali metal hydroxide-containing solutions. The solubility must be high enough for the outer layer (A) to be dissolvable within the period of contacting. However, a readily soluble outer layer (A) can entail adverse consequences for the film surface. Thus, the film surface can have a tendency for sticking and blocking when the dissolution process is unintentionally initiated as a result of moisture effects (for example atmospheric humidity during storage). Furthermore, the outer layer (A) can exhibit swelling behaviour as a result of premature and creeping solvent absorption which consequently results in deformation of the film and in particular in so-called "curling". It is therefore necessary to strike a balance between ready and moderate solubility.

The polyester film according to the invention is suitable as a carrier film in embossing applications for which a flawless film surface is mandatory. In this context flawless is to be understood as meaning in particular a certain resistance to external influences such as for example high atmospheric humidity, high storage temperatures and the ability to be provided with further aqueous coatings in the context of the embossing process.

It has surprisingly been found that the copolyester according to the invention combines good solubility characteristics and resistance towards moisture influences and moreover allows application of an optional coating to the outer layer (A) thus provided. This copolyester is a copolyester in which 5-sulfoisophthalic acid is copolymerized in addition to the monomers terephthalic acid and ethylene glycol always present in PET. The copolyester may comprise further units derived from dicarboxylic acids and diols, wherein the units derived from dicarboxylic acids and the units derived from diols in each case sum to 100 mol %.

When the copolyester comprises further units derived from dicarboxylic acids and diols these are preferably units derived from isophthalic acid and diethylene glycol.

According to the present invention it is preferable when the units derived from dicarboxylic acids consist of 65 to 95 mol %, preferably 75 to 95 mol %, particularly preferably 88 to 93 mol %, of units derived from terephthalic acid, 5 to 15 mol %, preferably 7 to 13 mol %, of units derived from 5-sulfoisophthalic acid and 0 to 30 mol %, preferably 0 to 15 mol %, particularly preferably 0 to 7 mol %, of units derived from isophthalic acid and the units derived from diols consist of 90 to 100 mol %, preferably 94 to 98 mol %, of units derived from ethylene glycol and 0-10 mol %, preferably 1 to 7 mol %, of units derived from diethylene glycol, wherein the units derived from dicarboxylic acids and the units derived from diols in each case sum to 100 mol %.

It is particularly preferable when the units derived from dicarboxylic acid consist of 65 to 95 mol %, preferably 75 to 95 mol %, particularly preferably 88 to 93 mol %, of units derived from terephthalic acid and 5 to 15 mol %, preferably 7 to 13 mol %, of units derived from 5-sulfoisophthalic acid and the units derived from diols consist of 90 to 100 mol %, preferably 94 to 98 mol %, of units derived from ethylene glycol and 0-10 mol %, preferably 1 to 7 mol %, of units derived from diethylene glycol, wherein the units derived from dicarboxylic acids sum to 100 mol %.

If the specified molar ranges are exceeded or undershot this results in an altered solubility of the outer layer (A) and the polyester film no longer has the desired washability.

The direct reusability of unsaleable film remnants generated during production is crucial to the ability to achieve economic production of the polyester film. Said remnants are typically collected, shredded and returned to the process either directly as chopped material or after preceding extrusion and granulation to afford regenerate. It is preferable when the regenerate is only supplied to the base layer (B) so that any impurities brought about by the regeneration process are not introduced into the outer layers (A) and thus do not have an adverse effect on surface quality. The regeneration process can also lead to gel formation and colour changes due to degradation processes during the extrusion. This occurs to a greater extent when different polyester types (for example due to different copolyesters) are extruded together. It was therefore surprising that the extrusion of the composition according to the invention only resulted in gel formation of an extent comparable with that of conventional films and thus requires no further measures.

The supplying of regenerate into the base layer (B) of the polyester film also results in introduction of copolyester of the outer layer (A) into the base layer (B). However, this must not result in the base layer (B) also exhibiting a solubility in the alkali metal hydroxide-containing solution with the result that selective detachment of the outer layer (A) from the base layer (B) is no longer ensured. The introduction of copolyester into the base layer (B) proceeds according to the thickness of the outer layer (A) relative to the total film thickness. At a typical proportion per outer layer of 10% of the total film thickness an introduction of up to 20% of copolyester into the base layer would result in the case of double-sided provision with an outer layer (A). The base layer must not exhibit elevated solubility at this proportion. The use of the composition according to the invention ensures that the base layer does not exhibit an elevated solubility even when proportions of the polyester of up to 40 wt % are introduced into the base layer via the regenerate stream.

While exhibiting ready solubility at the film surface, the film must also be capable of supporting a coating without having an adverse effect on the function of the coating. Such a coating may be an adhesion promoting coating or a coating having release properties, such as for example silicone coatings, waxes or fluorinated polymers. A coating may have been applied to the at least one outer layer (A) of the polyester film or, if two outer layers (A) are present, to the first outer layer (A) and to the second outer layer (A). The coating is preferably an adhesion promoting coating or an anti-adhesion coating. The coating has preferably been applied to the at least one outer layer (A) of the polyester film or, if present, to the first outer layer (A) and the second outer layer (A) using an in-line process. Alternatively, if the polyester film comprises only one outer layer (A) the coating may also have been applied only to the outer layer (A) or to the outer layer (A) and to the side of the base layer (B) facing away from the outer layer (A).

When the polyester film comprises the at least one outer layer (A) and an outer layer (C) on the surface of the polyester film facing away from the outer layer (A) it is possible for only the at least one outer layer (A) to bear a coating or for the at least one outer layer (A) and the outer layer (C) to have been provided with a coating. Alternatively the coating may have been applied only to the outer layer (C).

The present invention further relates to the use of the polyester film according to the invention as a carrier film, preferably for labels and embossing films.

Process for Producing a Polyester Film According to the Invention

The present invention relates to a process for producing a polyester film according to the invention comprising initially melting the polyester/the polyester mixture of the individual layers of the film in extruders, forming the resulting melts into flat melt films in a multilayer nozzle, pressing them through a wide-slot die and hauling off the resulting film on a cooling roll and one or more haul-off rolls to effect cooling and solidification, biaxially stretching it and subsequently heat-setting and winding up the film.

characterized in that the at least one outer layer (A) consists to an extent of at least 60 wt % of a copolyester consisting of units derived from dicarboxylic acids and diols, wherein the units derived from dicarboxylic acids comprise at least 65 mol % of units derived from terephthalic acid and at least 5 mol % of units derived from 5-sulfo-isophthalic acid and the units derived from diols comprise at least 90 mol % of units derived from ethylene glycol.

A coating may have been applied to the at least one outer layer (A) of the polyester film or, if two outer layers (A) are present, to the first outer layer (A) and to the second outer layer (A). The coating is preferably an adhesion promoting coating or an anti-adhesion coating, preferably an adhesion promoter coating. If only one outer layer (A) is applied to the polyester film an additional outer layer (C) may additionally be applied to the side of the polyester film opposite the outer layer (A).

It is preferable when the adhesion promoting coating and the anti-adhesion coatings are applied in-line during the production process of the biaxially oriented polyester film. The application of the coating (single-sided) or the coatings (double-sided) is carried out after the longitudinal stretching and before the transverse stretching (or less preferably in the case of a simultaneous stretching line before the longitudinal and transverse stretching). In order to achieve good wetting of the polyester film with the coating the film surface(s) is/are preferably initially corona-treated. The coating(s) may be applied with a customary suitable process such as with a curtain coater or a spray process. Application of the coating(s) using the "reverse gravure-roll coating" process, in which the coating(s) can be applied very homogeneously, is particularly preferred. Application by the mayer-rod process, by which greater coating thicknesses are achievable, is likewise preferred. The coating components can react with one another during the drying and stretching of the polyester film and particularly during the subsequent heat treatment which can reach temperatures of up to 240° C. The in-line process is economically more attractive since one or both coatings can be applied simultaneously with the production process of the film, thus making it possible to omit a process step (see below: off-line process).

In an alternative process one or both coatings are applied by off-line technology. This comprises applying the coating according to the present invention to the relevant surface(s) of the polyester film in an additional process step downstream of the film production using off-line technology, wherein a gravure roller (forward gravure) for example is used. The maximum limits of coating thickness are determined by the process conditions and the viscosity of the coating dispersion and find their upper limit in the processability of the coating dispersion.

Process for Recycling a Polyester Film

The present invention relates to a process for recycling a polyester film comprising the steps of comminuting a multilayer polyester film according to the invention comprising at least one outer layer (A) and a base layer (B), contacting the comminuted polyester film with an aqueous NaOH-containing solution, separating the comminuted polyester film, wherein the comminuted polyester film no longer comprises an outer layer (A), drying the comminuted polyester film.

Industrial washing processes for cleaning used plastic articles are well known. In particular, numerous processes as used for the processing of PET bottles are disclosed. The processes include many that follow approximately the following scheme: Collecting the wastes to be recycled, presorting into appropriate plastic types (as far as possible), mechanically comminuting the weights to increase the surface area, cleaning step using liquid washing liquors for removal of contamination, drying step.

The process according to the invention for recycling a polyester film employs used polyester films. These are in a pre-sorted state (varietally pure) but are still contaminated, thus preventing direct recycling. Contamination is to be understood as meaning any impurity resulting from the preceding use and storage of the used polyester film which prevents direct recycling.

The main focus of the present invention is on the cleaning step using aqueous alkali metal hydroxide-containing solutions. It is assumed hereinbelow that the wastes to be recycled are already in a presorted state (varietally pure) but still contaminated, thus preventing direct recycling. A particular focus is on wastes of process films made of polyester, as in the case of siliconized liners for example and such as are employed as carrier films in embossing processes (hot stamping, cold transfer). Large areas of this carrier film still carry lacquer residues after use where, as a result of the embossing motif, no transfer was intended.

It is advantageous for the washing operation for the film wastes to be comminuted. This facilitates the mixing of film snippets/shreds in liquid media and also increases the target surface area of the washing liquor. In terms of the manner of comminuting the film there are in principle no limitations provided it is ensured that the film is comminuted into shreds that may be employed in the process for recycling according to the invention. Comminution of the film may be carried out using a film grinder for example. Such film grinders are marketed by Pallmann for example. The use of such a film grinder comminutes the film into shreds preferably having a size of 5-50 mm in length and 2-20 mm in width.

It is difficult to ensure that the wastes are freed of contamination using exclusively water and added surfactants. The use of mechanical elements in the washing process is one option for markedly increasing the efficiency of the cleaning process. However, for wastes that are already present in small particle sizes the options for achieving sufficient cleaning performance using brushes or frictional elements for example are limited. This makes it necessary to use targeted chemical treatment of the wastes. In the case of polyester wastes it is possible to exploit the fact that the esterification can be reversed by alkaline attack, also known as saponification. It has surprisingly been found that contaminants adhering to the surface of the film wastes which are not detachable without mechanical agency can be detached as a result of the uppermost plies of the polyester surface including the impurity being leached out by the saponification. The adherent soiling thus need not be soluble in the liquor; on the contrary the cleaning effect is a consequence of the solubility of the soiled polyester matrix. A precondition for this is a sufficient dwell time of the alkaline medium and suitable process conditions (for example temperature, duration and concentration of the alkali metal hydroxide-containing solution).

Excessive dwell time results in a loss of recyclable polyester material since the saponification reaction occurs not only on the soiled sites but also on unsoiled sites of the wastes, thus resulting in unnecessary saponification of large amounts of polyester. Saponified material is then very largely in the form of monomers and is no longer available to the recycling process. The monomers dissolved in the washing liquor would need to be laboriously separated in further steps and once again subjected to polycondensation to afford polyester. If, by contrast, the dwell time is reduced far enough to keep the losses of clean polyester through saponification low there is a risk of incomplete cleaning and thus entrainment of contamination into the recycling circuit. The latter would markedly reduce the quality of the resulting recyclate and incomplete cleaning is therefore to be prevented under all circumstances.

As a result it is intended that the film wastes be saponified quickly by the alkali metal hydroxide-containing solution only at the surface to which soiling can adhere and slowly at the inner fabric. This makes it possible to ensure complete cleaning during the reaction duration according to the invention while simultaneously limiting the losses through saponification since the saponification reaction proceeds only slowly at the deeper regions of the wastes. For this reason the polyester film according to the invention has a multilayer construction such that the base layer (B) (=inner portion of the film wastes) is saponifiable slowly and the outer layer (A) (=outer layers of the wastes) is saponifiable quickly.

According to the invention the recycling employs an aqueous alkali metal hydroxide-containing solution with which the comminuted multilayer polyester film is contacted. The aqueous alkali metal hydroxide solution is preferably an aqueous NaOH-containing solution or an aqueous KOH-containing solution.

The alkali metal hydroxide-containing solution is preferably a 1 to 10 wt % solution, particularly preferably a 1 to 3 wt % solution.

During the recycling the comminuted polyester film is contacted with the alkali metal hydroxide-containing solution. The alkali metal hydroxide-containing solution is treated to a temperature of 60° C. to 98° C., preferably 80° C. to 95° C. The contacting of the comminuted multilayer polyester film with the aqueous alkali metal hydroxide-containing solution is performed within a period of 5 to 30 minutes, preferably 7 to 15 minutes. To increase the wetting of the polyester wastes by the aqueous alkali metal hydroxide-containing solution suitable surfactants may be added. Suitable surfactants include both ionic and nonionic surfactants, for example sodium lauryl sulfate and polyalkylene glycol ethers.

The contacting may be effected by adding the comminuted polyester film to the aqueous alkali metal hydroxide solution or by adding the aqueous alkali metal hydroxide solution to the comminuted polyester film. The contacting may be carried out in a stirred tank for example. In this case the film shreds are added to the alkali metal hydroxide-containing solution and mechanically recirculated by a stirrer. The mixing may alternatively be performed in a fluidized bed reactor.

The comminuted polyester film is subsequently separated, optionally rinsed with water and dried. Contemplated methods for drying the shreds include all commonly used drying methods. The drying of the shreds may for example be performed in a hot air stream at 110° C. or in a downstream fluidized bed reactor.

During the contacting of the comminuted polyester film with the aqueous alkali metal hydroxide solution and the outer layer (A) is completely dissolved. The resulting comminuted polyester film therefore no longer comprises an outer layer (A).

The resulting recycled polyester film is of high quality and may be used to produce new polyester, in particular polyester films. The recycled polyester film may be used in a process for producing the multilayer, coextruded polyester film according to the invention.

The present invention consequently relates to a process for producing a polyester film which employs a recycled polyester film obtained and/or obtainable by the process for recycling a polyester film according to the invention.

Methods of Measurement

The following methods of measurement were used.

Determining Solubility of the Film Layers

The film to be measured had a piece having dimensions of 5 cm×20 cm cut out of it and using a thickness tester the total film thickness was measured over at least 5 sites and averaged over all measurement sites (arithmetic mean). The measurement points are to be marked with a suitable pen or the like. In a 500 mL beaker a 2 wt % aqueous NaOH solution was heated to a temperature of 90° C. The film piece was immersed in the hot solution and left alone to dwell for 10 minutes. The film piece was removed and rinsed with cold water and subsequently dried. The thickness measurement was repeated at the marked points and after appropriate averaging compared with the first values. By taking the difference the absolute thickness reduction in μm was determined.

EXAMPLES

Raw Materials Used

- PET 1 Polyethylene terephthalate (PET), PET 4004 (manufacturer: Invista & Fibres GmbH, Germany),
- PET 2 Random copolyester, wherein the acid component has the composition 9.8 mol % 5-sulfoisophthalic acid, 90.2 mol % terephthalic acid; and the diol component has the composition 2.9 mol % diethylene glycol and 97.1 mol % ethylenediol.
- MB1 Masterbatch of 98.5 wt % of PET 4004 and 1.5 wt % of amorphous SiO2, SYLOBLOC® 46 (manufacturer: Grace GmbH, Worms, Germany); average particle diameter d50 according to data sheet 2.9-3.5 μm.

Production of an Uncoated Film

Specimens having a 2-layered AB construction were produced, wherein the outer layer (A) had a thickness of about 10% of the total film thickness and represents the readily soluble layer. The base layer (B) consists only of conventional polyester without further additives. The raw materials were melted by extrusion and coextruded in a wide-slot die to form the so-called pre-film. The pre-film which had a total thickness of 613 μm had a specimen having dimensions of about 11×11 cm cut out of it and biaxially oriented with a stretching frame. At a stretching temperature of 95° C. the film was stretched by a factor of 3.5 in the machine direction (MD) and by a factor of 3.5 in the transverse direction (TD) and subsequently thermoset for a duration of 30 seconds at a temperature of 225° C. The resulting biaxially stretched polyester film had a total thickness of about 50 μm, wherein the outer layer (A) accounted for about 5 μm thereof.

TABLE 1

Formulations and measured values of the examples

| Example | Outer layer A | Base layer B | Total film thickness before solution test [μm] | Total film thickness after solution test [μm] | Thickness reduction of outer layer A [μm] |
|---|---|---|---|---|---|
| 1 | 92% PET 2<br>8% MB1 | 100% PET 1 | 48 | 42 | 6 |

TABLE 1-continued

| Formulations and measured values of the examples | | | | | |
|---|---|---|---|---|---|
| Example | Outer layer A | Base layer B | Total film thickness before solution test [μm] | Total film thickness after solution test [μm] | Thickness reduction of outer layer A [μm] |
| VB1 | 92% PET 1 8% MB1 | 100% PET 1 | 50.6 | 50.6 | 0 |
| VB2 | 40% PET2 52% PET1 8% MB1 | 100% PET 1 | 56 | 56 | 0 |

Example 1

In addition to the readily soluble copolyester (PET 2) an $SiO_2$-containing masterbatch was additionally introduced in the outer layer (A) to ensure the windability of the film. The mixture of copolyester and masterbatch did not result in any discernible streaks or gels in the film and optical appearance is very good. The solubility test disclosed that the outer layer (A) had completely dissolved under the simulated washing conditions. The remaining base layer (B) remained optically untouched in the solution and was able to be separated without issue.

Comparative Example 1

A film was produced as in example 1 but using PET 1 instead of PET 2. The outer layer (A) was not able to be removed in the solubility test.

Comparative Example 2

The readily soluble polyester (PET 2) from example 1 was incorporated into the outer layer (A) in a lower concentration such that the proportion was not more than 40 wt %. This composition means that the outer layer (A) is no longer sufficiently soluble and it was no longer separable from the base layer (B) in the washing test. The outer layer (A) became whitish-matt and opaque and exhibited a tendency for sticking to itself and to the vessel wall. Removal of the thus incipiently dissolved outer layer (A) was achieved only using additional mechanical measures, for example by scraping with a wooden spatula. However, this behaviour is not tolerable for a processing of plastic wastes that is to be operated on an industrial scale.

Coating a Film

In order to test the suitability of the film as a substrate for various coatings to be applied, a film production line was used to produce films in a thickness of 23 μm by melting the polyester/the polyester mixtures of the individual layers of the film in extruders, forming the resulting melts into flat melt films in a multilayer nozzle, pressing them through a wide-slot die and hauling off the resulting film on a cooling roll and one or more haul-off or take-off rolls to effect cooling and solidification, biaxially stretching the film and providing it with various coatings in an in-line process and subsequently heat-setting and winding up the film before testing its functionality. For the sake of comparability specimens where the coatings are in each case exclusively on the outer layer (A), as well as specimens where the coatings are exclusively on the outer layer (C), were fabricated. The latter configuration is representative of a conventionally coated polyester film surface. The following table summarizes the formulations of the polyester films and the coating applied.

TABLE 2

| Coating of outer layer (A) | | | | | | |
|---|---|---|---|---|---|---|
| Example | Outer layer (A) | Base layer (B) | Outer layer (C) | Thickness of outer layer (C) | Thickness of outer layer (A) | Coating |
| 2 | 80 wt % PET 2 12 wt % PET 1 8 wt % MB1 | 100 wt % PET 1 | 92 wt % PET 1 8 wt % MB1 | 1.5 μm | 2.5 μm | C 1 |
| 3 | 80 wt % PET 2 12 wt % PET 1 8 wt % MB1 | 100 wt % PET 1 | 92 wt % PET 1 8 wt % MB1 | 1.5 μm | 2.5 μm | C 2 |

Example 2

To be able to exclude adverse effects of the outer layer (A) on a separation coating the function of a silicone coating (C1) on outer layer A and for comparison also on outer layer C was tested with the release test. After application of the adhesive tape to the side of the film coated in each case the siliconized sides were investigated in respect of their release behaviour with the release test after intervals of 30 minutes, 24 hours and 72 hours. It is apparent from the following table that the release values of both sides are comparable and accordingly the outer layer (A) does not have an adverse effect on the function of a silicone coating.

TABLE 3

| Release values of the coated outer layers | | | |
|---|---|---|---|
| | Release [g/25 mm] after 30 min | Release [g/25 mm] after 24 h | Release [g/25 mm] after 72 h |
| Coating on outer layer (A) | 12.22 | 15.33 | 19.04 |
| Coating on outer layer (C) | 12.01 | 14.47 | 16.98 |

Example 3

To be able to exclude negative effects of the outer layer (A) on an adhesion promoting coating the function of an acrylate-based adhesion promoter (C2) in respect of adhesive strength was tested. To this end the coated side was coated with a screen printing ink (SPECIAL SERICARD® CDA30, Fuji) using a laboratory coating instrument (COATMASTER® 510, Erichsen) and the multiply coated film was dried in an oven at 150° C. for 60 seconds. The adhesive bond strength of the screen printing ink on the film was tested using TESA® 4104 adhesive tape and was able to be evaluated with a rating of 0-1. The ink adheres to the adhesion promoting coating without being torn off irrespective of whether the adhesion promoter was applied to the outer layer (A) or to the outer layer (C).

Example 4

Once the film had demonstrated its suitability for carrying a securely anchored printing ink the recyclability of this film laminate was investigated. The specimen from example 3 was cut into 1.5×1.5 cm pieces and stirred in a 2 wt % aqueous NaOH solution having a temperature of 90° C. for 10 min. The ink was completely separated from the film. The film remnants sank on account of their higher density and exhibited a completely transparent, unblemished appearance which documents the completeness of the separation.

Comparative Example 3

For comparison, the examples 3 and 4 were repeated with a polyester film with no solubility from comparative example 1. The adhesion promoting coating and the screen printing ink were able to be applied without issue just as in example 3. However, upon attempting to separate the film laminate via a bath in 2 wt % NaOH solution no separation whatsoever was observed and the polyester material thus could not be recovered.

That which is claimed:

1. A multilayer, coextruded film formed from polymer consisting of polyester and copolyester, said film comprising at least one outer layer (A) and a base layer (B), wherein the at least one outer layer (A) consists to an extent of at least 60 wt % of a copolyester consisting of units derived from dicarboxylic acids and diols, wherein the units derived from dicarboxylic acids comprise at least 65 mol % of units derived from terephthalic acid and at least 5 mol % of units derived from 5-sulfo-isophthalic acid and the units derived from diols comprise at least 90 mol % of units derived from ethylene glycol;

the polyester is formed from dicarboxylic acid consisting of terephthalic acid and optional isophthalic acid; and the copolyester is formed from dicarboxylic acid consisting of terephthalic acid, 5-isophthalic acid and optional isophthalic acid.

2. The polyester film according to claim 1, wherein the units derived from dicarboxylic acids consist of 65 to 95 mol % of units derived from terephthalic acid, 5 to 15 mol % of units derived from 5-sulfo-isophthalic acid and 0 to 30 mol % of units derived from isophthalic acid and the units derived from diols consist of 90 to 100 mol % of units derived from ethylene glycol and 0-10 mol % of units derived from diethylene glycol, wherein the units derived from dicarboxylic acids and the units derived from diols in each case sum to 100 mol %.

3. The polyester film according to claim 1, wherein the at least one outer layer (A) is a first outer layer (A) and the polyester film additionally comprises a second outer layer (A) which has been applied to the surface of the polyester film opposite the first outer layer (A).

4. The polyester film according to claim 1, wherein the polyester film comprises an outer layer (C) which has been applied to the surface of the polyester film opposite the first outer layer (A).

5. The polyester film according to claim 1, wherein the at least one outer layer (A) has a thickness of 0.5 μm to 6 μm.

6. The polyester film according to claim 5, wherein the at least one outer layer (A) has a thickness of 1 μm to 3 μm.

7. The polyester film according to claim 1, wherein a coating has been applied to the at least one outer layer (A).

8. The polyester film according to claim 7, wherein the coating has been applied via an in-line process.

9. The polyester film according to claim 7, wherein the coating is an adhesion promoting coating or an anti-adhesion coating.

10. A process for producing a polyester film according to claim 1, wherein said process comprises initially melting the polyester/the polyester mixture of the individual layers of the film in extruders, forming the resulting melts into flat melt films in a multilayer nozzle, pressing the flat melt films through a wide-slot die and effecting cooling and solidification by hauling off the resulting pressed flat melt film onto a cooling roll and one or more haul-off rolls, biaxially stretching the solidified film and subsequently heat-setting and winding up the biaxially stretched film, wherein the at least one outer layer (A) consists to an extent of at least 60 wt % of a copolyester consisting of units derived from dicarboxylic acids and diols, wherein the units derived from dicarboxylic acids comprise at least 65 mol % of units derived from terephthalic acid and at least 5 mol % of units derived from 5-sulfo-isophthalic acid and the units derived from diols comprise at least 90 mol % of units derived from ethylene glycol, wherein the units derived from dicarboxylic acids and the units derived from diols in each case sum to 100 mol %.

11. The process according to claim 10, wherein process further comprises coating the film with a coating composition during the production process.

12. A process for recycling a polyester film comprising the steps of comminuting a multilayer polyester film according to claim 1 comprising at least one outer layer (A) and a base layer (B), in which the at least one outer layer (A) consists to an extent of at least 60 wt % of a copolyester consisting of units derived from dicarboxylic acids and diols, and wherein the units derived from dicarboxylic acids comprise at least 65 mol % of units derived from terephthalic acid and at least 5 mol % of units derived from 5-sulfo-isophthalic acid and the units derived from diols comprise at least 90 mol % of units derived from ethylene glycol, contacting the comminuted polyester film with an aqueous alkali metal hydroxide-containing solution, separating the comminuted polyester film, wherein the comminuted polyester film no longer comprises an outer layer (A), drying the comminuted polyester film.

13. The process according to claim 12, wherein the aqueous alkali metal hydroxide-containing solution is an NaOH- or KOH-containing solution.

14. The process according to claim 12, wherein the aqueous alkali metal hydroxide-containing solution is a 1 to 10 wt % aqueous NaOH- or KOH-containing solution and has a temperature of 60° C. to 98° C.

15. The process according to claim 14, wherein the aqueous alkali metal hydroxide-containing solution is at the temperature of 80° C. to 95° C.

16. The process according to claim 12, wherein the contacting with the aqueous alkali metal hydroxide-containing solution step is performed for a period of 5 to 30 minutes.

17. The process according to claim 16, wherein the contacting with the aqueous alkali metal hydroxide-containing solution step is performed for a period of 7 to 15 minutes.

18. A carrier film comprising the polyester film according to claim 1.

19. The carrier film according to claim 18, wherein the carrier film is a label film or embossing film.

20. A process for producing a polyester film comprising employing a recycled polyester film obtained by a process according to claim 12 in polyester film production.

* * * * *